US012013954B2

United States Patent
Sahita et al.

(10) Patent No.: US 12,013,954 B2
(45) Date of Patent: Jun. 18, 2024

(54) SCALABLE CLONING AND REPLICATION FOR TRUSTED EXECUTION ENVIRONMENTS

(71) Applicant: Intel Corporation, Santa Clara, CA (US)

(72) Inventors: Ravi Sahita, Portland, OR (US); Dror Caspi, Kiryat Yam (IL); Vedvyas Shanbhogue, Austin, TX (US); Vincent Scarlata, Beaverton, OR (US); Anjo Lucas Vahldiek-Oberwagner, Portland, OR (US); Haidong Xia, Folsom, CA (US); Mona Vij, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 261 days.

(21) Appl. No.: 17/710,723

(22) Filed: Mar. 31, 2022

(65) Prior Publication Data
US 2022/0222358 A1  Jul. 14, 2022

(51) Int. Cl.
*G06F 21/60* (2013.01)
*G06F 9/455* (2018.01)
(Continued)

(52) U.S. Cl.
CPC ........ *G06F 21/602* (2013.01); *G06F 9/45558* (2013.01); *G06F 21/53* (2013.01); *G06F 21/54* (2013.01); *G06F 2009/4557* (2013.01); *G06F 2009/45587* (2013.01); *G06F 2009/45595* (2013.01)

(58) Field of Classification Search
CPC ........ G06F 21/53; G06F 21/54; G06F 21/602; G06F 9/45558; G06F 2009/4557; G06F 2009/45587; G06F 2009/45595
See application file for complete search history.

(56) References Cited

U.S. PATENT DOCUMENTS

2014/0040890 A1 * 2/2014 Novak .................... G06F 21/53
718/1
2017/0104597 A1 * 4/2017 Negi ..................... H04L 9/0825
(Continued)

OTHER PUBLICATIONS

Intel, "Architecture Specification: Intel® Trust Domain Extensions (Intel®) TDX) Module", 344425-003US, Aug. 2021, 304 pages.
(Continued)

*Primary Examiner* — Chau Le
(74) *Attorney, Agent, or Firm* — Nicholson De Vos Webster & Elliott LLP

(57) ABSTRACT

Scalable cloning and replication for trusted execution environments is described. An example of a computer-readable storage medium includes instructions for receiving a selection of a point to capture a snapshot of a baseline trust domain (TD) or secure enclave, the TD or secure enclave being associated with a trusted execution environment (TEE) of a processor utilized for processing of a workload; initiating cloning of the TD or secure enclave from a source platform to an escrow platform; generating an escrow key to export the snapshot to the escrow platform; and exporting a state of the TD or secure enclave to the escrow platform, the state being sealed with a sealing key.

20 Claims, 8 Drawing Sheets

(51) Int. Cl.
  *G06F 21/53* (2013.01)
  *G06F 21/54* (2013.01)

(56) References Cited

U.S. PATENT DOCUMENTS

| | | | | |
|---|---|---|---|---|
| 2018/0089468 A1* | 3/2018 | Rozas | ............ | G06F 21/6245 |
| 2018/0212939 A1* | 7/2018 | Costa | ............ | G06F 12/1408 |
| 2021/0248227 A1* | 8/2021 | Yang | ............ | G06F 21/606 |
| 2021/0336994 A1* | 10/2021 | Scarlata | ............ | H04L 63/20 |
| 2023/0106455 A1* | 4/2023 | Bursell | ............ | H04L 9/0897 |
| | | | | 726/22 |

OTHER PUBLICATIONS

Intel, "Guest-Host Communication Interface (GHCI) Specification for Intel® Trust Domain Extensions (Intel® TDX 1.0)", 344426-002US, Sep. 2021, 41 pages.

Intel, "Guest-Host-Communication Interface (GHCI) for Intel® Trust Domain Extensions (Intel® TDX 1.5)", 348552-001US, Sep. 2021, 62 pages.

Intel, "Intel® TDX Module Architecture Specification: TD Migration", 348550-001US, Sep. 2021, 68 pages.

Intel, "Intel® TDX Virtual Firmware Design Guide", 344991-002US, Oct. 2021, 56 pages.

Intel, "Intel® Trust Domain CPU Architectural Extensions", 343754-002US, May 2021, 40 pages.

Intel, "Intel® Trust Domain Extensions—SEAM Loader (SEAMLDR) Interface Specification", 343755-002US, May 2021, 28 pages.

Intel, "Intel® Trust Domain Extensions (Intel® TDX) Module Architecture Application Binary Interface (ABI) Reference Specification", 348551-001US, Sep. 2021, 296 pages.

Intel, "Intel® Trust Domain Extensions (Intel® TDX) Module Base Architecture Specification", 348549-001US, Sep. 2021, 133 pages.

Intel, "Trust Domain Extension (TDX) Migration TD Design Guide", 348987-001, Oct. 2021, 49 pages.

Intel, White Paper, "Intel® Trust Domain Extensions", 343961-003US, Aug. 2021, 9 pages.

* cited by examiner

SCALABLE CLONING AND REPLICATION FOR TRUSTED EXECUTION ENVIRONMENTS

FIELD

This disclosure relates generally to the field of electronic devices and, more particularly, to scalable cloning and replication for trusted execution environments.

BACKGROUND

FaaS (Function as a Service) is an advanced cloud computing model that supports service-oriented application development and microservice-based deployment. In the FaaS model, customers execute code in the cloud, while the cloud service provider (CSP) hosts and manages back-end operation, from infrastructure through applications. In this manner, customers are responsible only for their own data and the functions they perform.

Workloads to provide functions, such as FaaS workloads, operate as stateless entities and typically have short lifetimes to service one or more service requests. After completion of the service requests, the workloads are torn down and the associated resources reclaimed. This process allows for efficient usage of resources.

However, in certain instances FaaS operation will have inefficiencies because of the inability to replicate the workloads for subsequent use. When combined with hardware trusted execution environments (TEEs), the FaaS workloads incur a high cost of building a workload container from scratch for each occurrence of the workload, and thus this operation becomes impractical.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
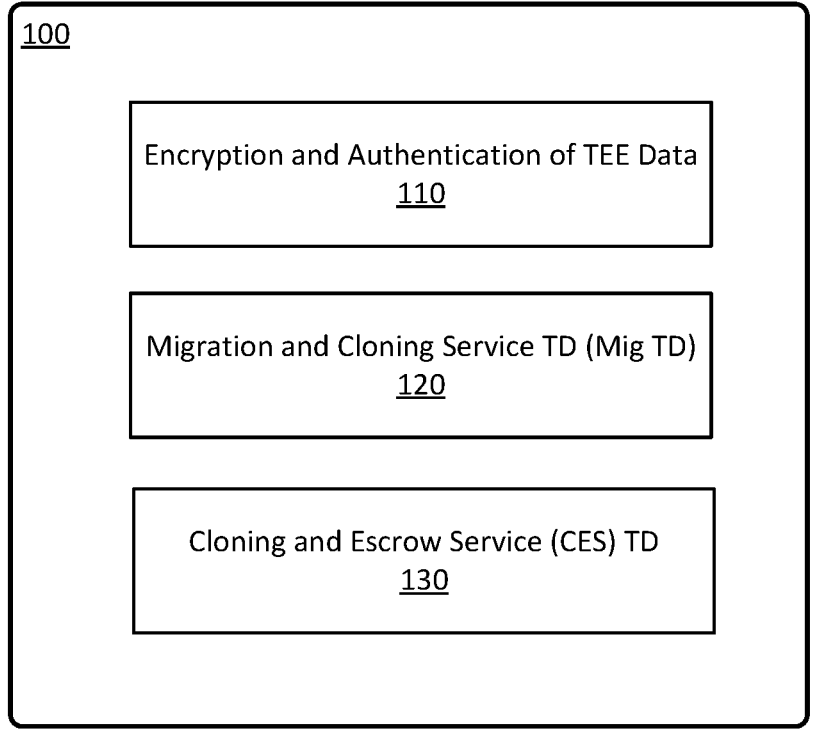
FIG. 1 illustrates cloning and replication for hardware trusted execution environments, according to some embodiments.

Embodiments described herein are directed to scalable cloning and replication for trusted execution environments.

In operations to provide function services, such as in FaaS (Function as a Service) workloads, numerous workload instances may be built, utilized for one or more service requests, and then torn down to reclaim the associated resources. Such operations may be provided in trusted execution environments (TEEs), such as Intel TDX (Trust Domain Extensions) and SGX (Software Guard Extensions). "Trusted execution environment" or "TEE" refers to a secure area of a processor, the TEE being an isolated execution environment that provides certain security features, such as isolated execution, integrity of applications executing within the TEE, and confidentiality.

When combined with trusted execution environments, FaaS workloads would incur a high cost associated with building the associated workload container from scratch with each request for one or more services because the TEEs do not authorize replication of TEE environments from a checkpoint, where a checkpoint is a snapshot of a computing system at a specific point in time.

However, in VM (Virtual Machine) based workloads, there are instances that may benefit from snapshotting a VM execution at a point in time, such as when a common database is loaded into memory that various services may need to access, and proceeding with an operation utilizing the snapshot at a later time. With current capabilities, this replication of trusted execution environments would not be authorized, and thus requiring that relevant workloads be built for each instance of a request.

In an operation related to function execution in a TEE, there are two sources of significant overhead, these being the TEE creation and the state copy that will be utilized in the TEE. In some embodiments, a system or process is to enable baseline TDs or secure enclaves (secure enclaves also being referred to as enclaves herein) that are available for function execution, and are not destroyed after the execution is complete. The state of the trust domain or enclave (referred to herein as the TD/enclave state) can be restored from the template TD/enclave, and this restored state may be utilized for function execution. In this manner, function execution in TEE is made practical, reducing the long startup times that would otherwise be prohibitive for executing functions in a TEE. Cloud service providers (CSPs) then can leverage this capability of scaling of confidential function TEEs as requests are queued.

In some embodiments, a system or process is provided to address limitations of trusted execution environment generation and use in existing technologies. In some embodiments, a system includes an escrow, snapshot, and cloning service trust domain (ESC Service TD) capability to enable replication of a hibernated state of a TD or enclave. A trust domain (TD) refers to a hardware-isolated, virtual machine (VM). Escrow (or key escrow) refers to a data security system in which a cryptographic key is entrusted to a third party (i.e., the key is kept in escrow).

Two sources of large overheads associated with TEE application are the TEE creation and the state copy. An embodiment addresses both of these overhead issues by enabling baseline TDs/enclaves that are available for function execution but that are not destroyed after execution is complete, and by providing that the state of the TD/enclave can be restored from the template TD/enclave and made ready for function execution. In this manner, the efficiency of operations utilizing TEEs for workloads may be greatly improved without creating security concerns in connection with the TEEs.

In some embodiments, an operation includes use of seal keys, and applies a hardware-measured and sealed (encrypted) escrow and cloning policy to enable creation of secure TD/enclave-specific migration sessions. The migration sessions are then used to migrate a hibernated state to enable TEE clones to be instantiated either locally or on a remote platform, without a virtual machine manager (VMM) being included in the trusted computing base (TCB). The exclusion of the VMM, which provides for creation and management of virtual machines (VMs), from the trusted computing base provides security that the VMM will be prevented from accessing a clones generated for a TEE except as directed by a system. "Trusted computing base" or TCB" refers to the components of a system that are required to establish and maintain the security of the system, and may include hardware, firmware, software, operating systems, and other elements.

In some embodiments, a system or apparatus includes a baseline template TD or enclave that may be cloned to create a new TD or enclave for function execution, while prohibiting the VMM from tampering with the cloned baseline template. The cloning process involves building the new TD or secure enclave, and then performing a checkpoint and restore of the TD/enclave state.

FIG. 1 illustrates cloning and replication for hardware trusted execution environments, according to some embodiments. In some embodiments, a system or architecture provides for cloning and replication of hardware trusted execution environments. In existing technologies, a TEE generally does not authorize replication of TEE environments from a checkpoint, and thus execution of a function in a TEE requires a new generation of the TEE environment with each function request as any prior instances have been torn down, generally making the execution of functions as a service within TEEs impractical.

In this high level example, a system 100 to provide for scalable cloning and replication of trusted execution environments includes at least the following key components:

Encryption and Authentication of TEE Data 110—In some embodiments, components, such as in the form of CPU firmware, Xucode for Intel Software Guard Extensions (SGX), or TDX Module extension interfaces, provide for encrypting and authenticating TEE data. In some embodiments, the system 100 utilizes encryption and authentication of TEE data to enable secure handling of TEE data, and to enable the maintenance of such data between usages to separate the TEE from a VMM. Operations provided include support for exporting, importing, and sealing TD assets. Further, TD state machine changes are provided to enable instantiation of a baseline TD or enclave that is used for cloning, but is not available for execution on the escrow platform.

Migration and Cloning Service TD (Mig TD) 120—The migration and cloning service (such as illustrated as element 314 in FIG. 3) operates to aid in validating platform authenticity, and provides for performing long running operations such as quote verification and generating escrow session keys and cloning keys.

Cloning and escrow service for TD or enclave 130—The cloning and escrow service (such as illustrated as element 304 in FIG. 3) further aids in validating platform authenticity, and provides for performing long running operations such as quote verification, generating sealing keys for TDs and enclaves, and escrow and cloning policy enforcement.

Figure 2:
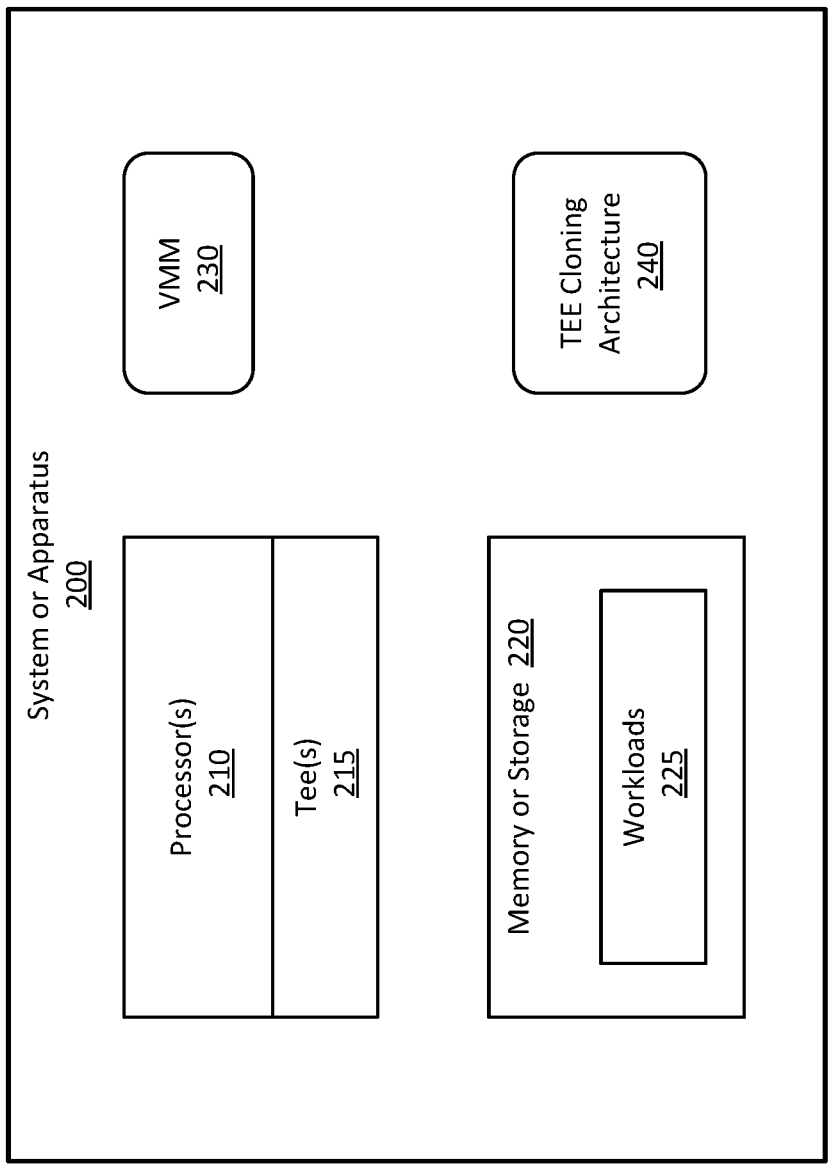
FIG. 2 illustrates a system or apparatus providing for cloning and replication for hardware trusted execution environments, according to some embodiments.

FIG. 2 illustrates a system or apparatus providing for cloning and replication for hardware trusted execution environments, according to some embodiments. As illustrated in FIG. 2, a system or apparatus 200 may include one or more processors 210, which may include a central processing unit (CPU), wherein the one or more processors may include one or more trusted execution environments (TEEs) 215. The TEEs may be utilized for one or more purposes, including, but not limited to, execution of functions, such as in the form of a function as a service (FaaS). An associated workload container may be built with the TEEs for processing of the workloads 225.

The system or apparatus 200 further includes a memory or storage 220, which may include storage or one or more workloads 225 in connection with execution in the one or more TEEs 215. Operation of the system or apparatus 200 includes a VMM 230 to provide for creation and management of virtual machines (VMs). In some embodiments, the system or apparatus 200 further includes a TEE cloning architecture 240 to enable scalable cloning and replication for hardware trusted execution environments.

In some embodiments, the system or apparatus 200 may be utilized to provide cloning of trust domains or secure enclaves for TEEs, the cloning operation allowing efficient servicing of functions as a service, such as enabled by a cloud service provider (CSP). The allows for repeated up of a TEE to handle multiple service requests, without being required to tear down and rebuild an associated workload container, and without enabling the VMM to access cloned TDs or enclaves except as intended for the operations, i.e., the VMM is prevented from accessing an incomplete or unauthorized clone.

Figure 3:
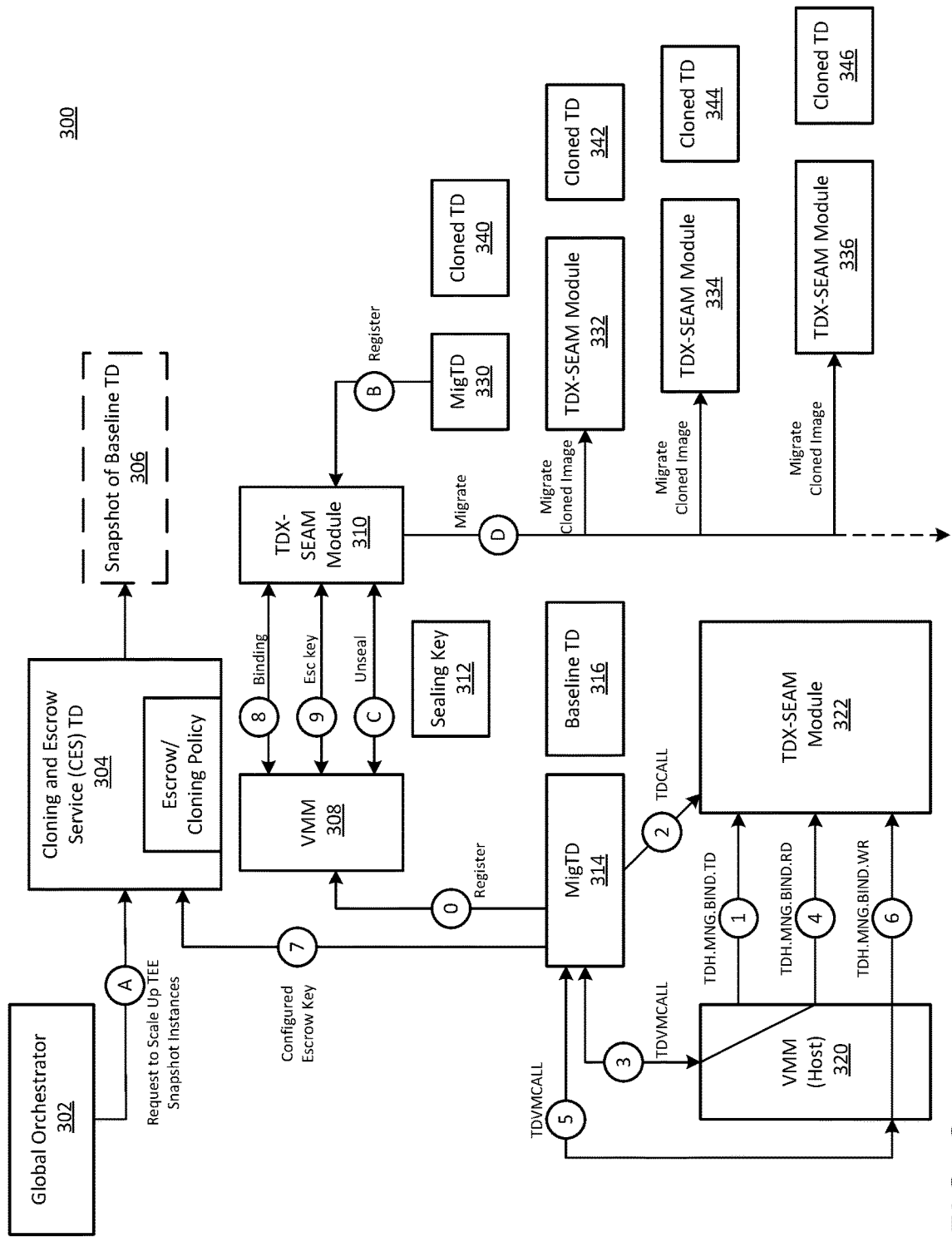
FIG. 3 is an illustration of a system architecture for scalable cloning for trusted execution environments, according to some embodiments.
Figure 7:
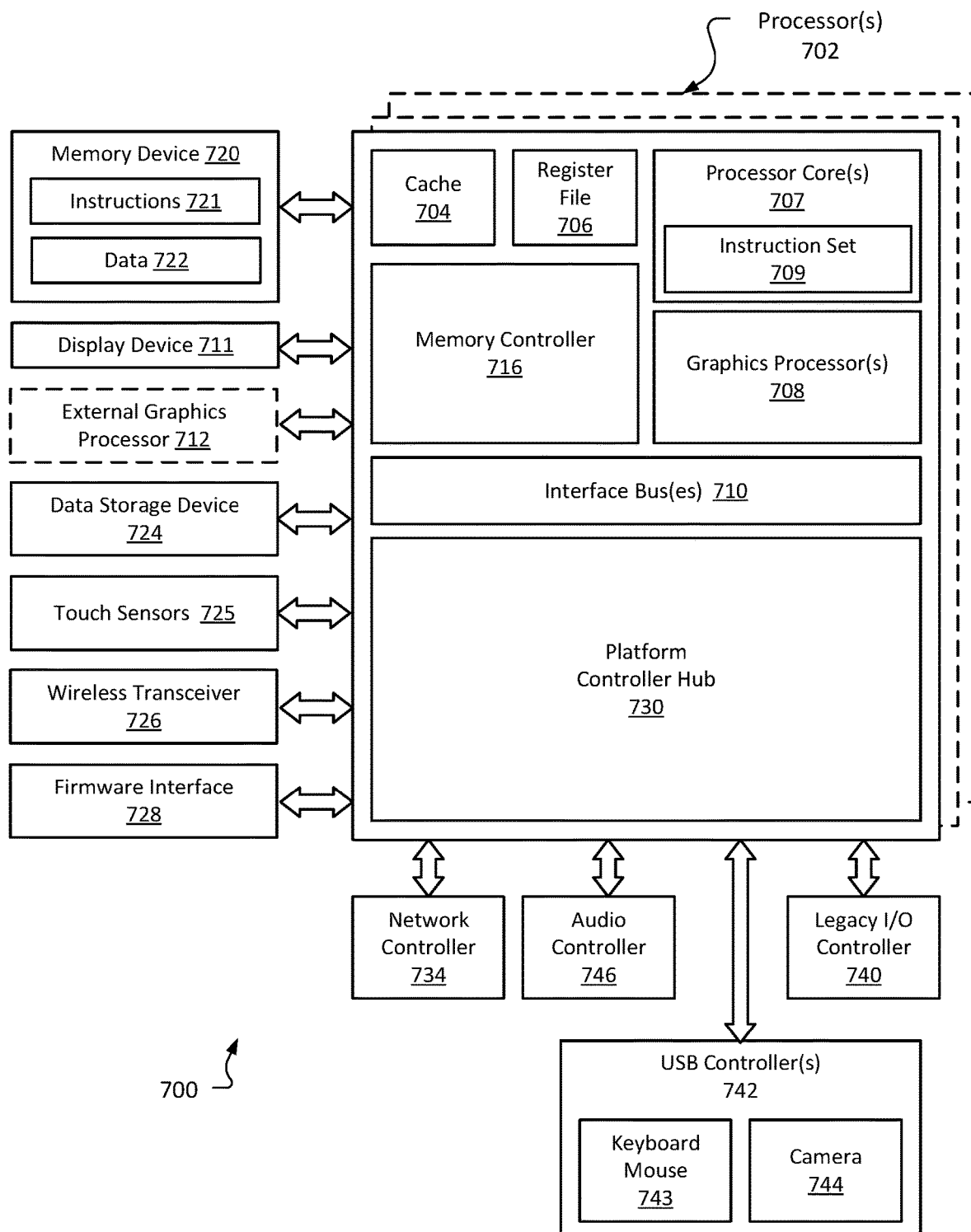
FIG. 7 illustrates an embodiment of an exemplary computing architecture for scalable cloning and replication for hardware trusted execution environments, according to some embodiments.

Additional elements of the system or apparatus 200 may be as illustrated in FIG. 3 and FIG. 7.

FIG. 3 is an illustration of a system architecture for scalable cloning for trusted execution environments, according to some embodiments. FIG. 3 illustrates a system 300 including components that enforce the following security objectives in usage of escrow in cloning of TDs or enclaves for TEEs:

A TEE tenant enforces cloning policies regarding when a snapshot for a TEE should be generated and how many instances of the snapshot should be instantiated;

A VMM host is prevented from commencing execution of an incomplete clone generated for a TEE; and The VMM host is prevented from commencing execution of more than the specified clones of TDs or enclaves.

As illustrated in FIG. 3, a system 300 includes global orchestration (such operations by an orchestrator) 302 and virtual machine manager (VMM) 308 for a system 300. In some embodiments, the system 300 further includes a cloning and escrow service (CES) trust domain (TD) 304, including an escrow and cloning policy, to enable a hibernated state of a TD or enclave, to perform operations including quote verification and generating sealing keys for TDs and enclaves, and to perform escrow and cloning policy enforcement in connection with the cloning of TEEs. For simplicity of illustration, FIG. 3 generally refers to trust domains (TDs), but embodiments also include secure enclaves.

As further illustrated in FIG. 3, the system includes a migration and cloning service TD (MigTD) 314 to validate platform authenticity and performing operations including quote verification and generating escrow session keys and cloning keys, and a TDX-SEAM (Trust Domain Extensions-Secure Arbitration Mode) module 310, where SEAM is an extension to the Virtual Machines Extension (VMX) architecture module. For illustration of operation, also shown are VMM 320 and TDX-SEAM module 322 instances. Further with regard to generation of clones of the TD or enclave are illustrated MigTD 330 and cloned TD or enclave 340, and TDX-SEAM modules 332, 334, and 336 and cloned TDs or enclaves 342, 344, and 346.

As illustrated, an operation may include the following TDX Module primitives that support the host VMM to clone TDs (while keeping VMM outside the TCB) are included:

TDH.MNG.BIND.TD—Binds an escrow service TD to the target baseline TD or enclave to initiate a snapshot and start an escrow session to snapshot the baseline TD or enclave for the cloning and escrow TDX CSP hosted platform. This primitive further sets up an escrow key to be used to capture the baseline TD/enclave snapshot.

TDH.MIG.EXPORT.*—API (Application Program Interface) to migrate out (encrypt and generate MAC (Message Authentication Code)) page contents (including memory and CPU state) to the cloning and escrow service platform. The pages may be migrated using, for example, AES-GCM-256 (Advanced Encryption Standard, Galois Counter Mode, 256-bit) encryption, with the metadata for memory mappings and CPU state being authenticated using the same encryption standard.

TDH.CLONE.SEAL.*—API to verify metadata per escrow key and, instead of storing the contents into memory, to store such contents in persistent storage with the data encrypted (sealed) with a TD-specific generated key derived for the TD from a local platform-rooted sealing key. The sealing key is associated with the baseline TD measurement and the measurement of the escrow and cloning policy. This operation may also be performed via a sealing enclave/service TD.

TDH.CLONE.UNSEAL.*—API to verify the value of the escrow TD or enclave measurement and to unseal (decrypt) the escrow and cloning policy and the persistent key into the escrow TD.

TDH.MIG.PAGE.IMPORT.*—API to migrate in (to verify MAC and decrypt) page contents (memory/CPU state) from the cloning and escrow service platform. The pages may be MAC-verified and decrypted using, for example, AES-GCM-256, with the metadata for memory mappings and CPU state being authenticated using the same encryption standard.

The system 300 may initially include (0) registration between the migration and cloning service TD 314 and the VMM 308, based on mutual authentication using TD quotes. The migration and cloning service TD 314 is illustrated with a baseline TD or enclave for an operation.

In an operation, (1) the VMM 320 binds an escrow service TD to a target baseline TD at the TDX-SEAM module 322 (TDH.MNG.BIND.TD<MigTD, TD, CloningPol>). (2) The migration and cloning service TD 314 is to call the TD (TDCALL<SetB indKey>) at TDX-SEAM module 322. (3) The migration and cloning service TD 314 is to provide the escrow/cloning policy to the VMM 320 (TDVMCALL (TDR DBIN DDATA)), and (4) the TDX-SEAM module 322 is to read the escrow/cloning policy (TDH.MNG.BIND.RD).

In some embodiments, (5) the migration and cloning service TD 314 is to write binding data protected by an escrow key (TDVMCALL (Write bind data (Set Mig Key)) to the VMM 320, and (6) the escrow key is to be configured (TDH.MNG.BIND.WR). (7) The configured escrow key is provided to the cloning and escrow service TD 304.

In some embodiments, the VMM 308 and TDX-SEAM module 310 proceed with (8) binding and (9) the escrow key being used to import assets and convert using a sealing key 312.

In some embodiments, a cloning operation by the system 300 is then illustrated as the global orchestration 302 providing a request to scale up TEE snapshot instances (A), the request being provided to the cloning and escrow service TD 304. The cloning and escrow service TD 304 is to generate a snapshot of the baseline TD/enclave 306. However, the snapshot destination TD cannot be executed at this point as the snapshot is static (sealed).

In some embodiments, the cloning operation then proceeds with (B) registering the migration and closing service TD 330 with the TDX-SEAM module 310, and (C) unsealing the snapshot of the baseline TD. (D) The TDX-SEAM module 310 is then to migrate the cloned TD image pursuant to the request, which is shown as, for example, TDX-SEAM module 332 providing cloned TD 342, TDX-SEAM module 334 providing cloned TD 344, TDX-SEAM module 336 providing cloned TD 346, and any additional cloned image.

In this manner, the system architecture allows for enforcing cloning policies regarding when instances of a TEE snapshot are instantiated, and how many instances will be instantiated. Further, in providing for sealing of instances and providing unsealing when migration for the cloned TDs is to be performed, the VMM host is prevented from commencing execution of an incomplete clone generated for a TEE, and is prevented from commencing execution of more than a specified number of clones.

Figure 4A:
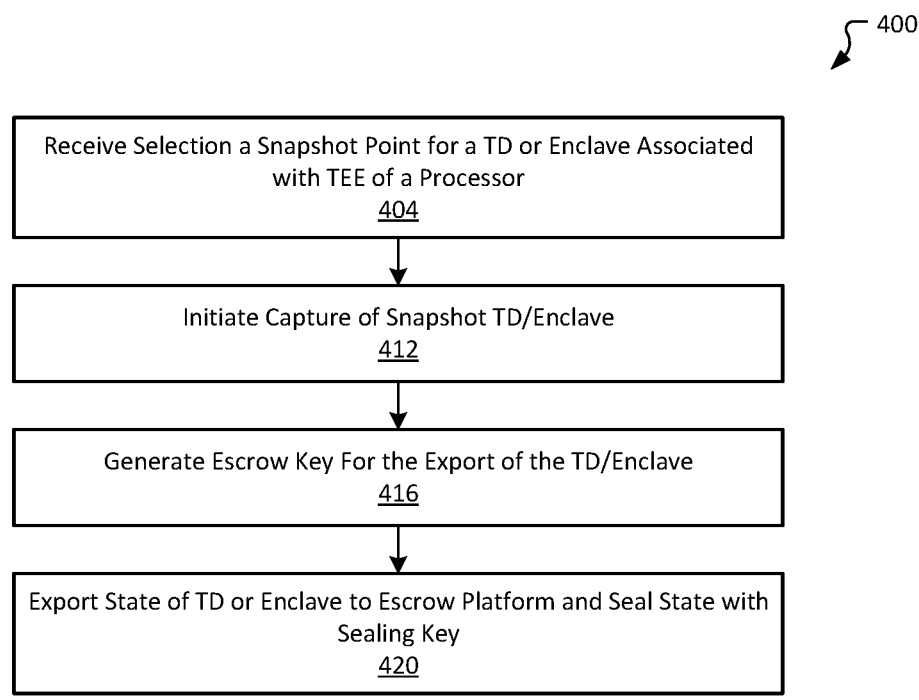
FIGS. 4A and 4B are flowcharts to illustrate a process for scalable cloning and replication for trusted execution environments, according to some embodiments.
Figure 4B:
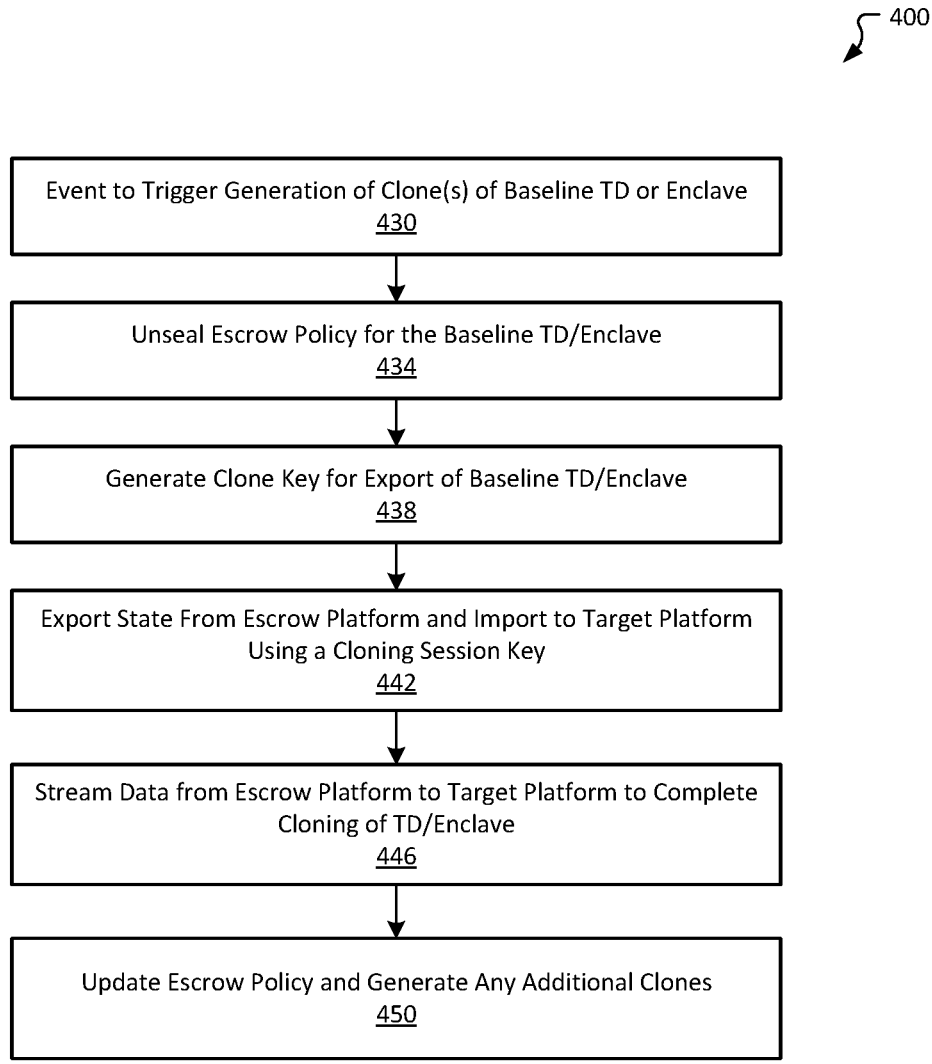

FIGS. 4A and 4B are flowcharts to illustrate a process for scalable cloning and replication for trusted execution environments, according to some embodiments. In some embodiments, as shown in FIG. 4A, a process 400 include receiving a selection of a snapshot point for a TD or enclave associated with a TEE of a processor 404.

In response to receipt of the selection, the process 400 proceeds with initiating capture of a snapshot of a baseline TD or enclave 412, and generating an escrow key for use in exporting the baseline TD or enclave 416. A state of the TD or enclave is then exported to an escrow platform, and the state is sealed with a sealing key. In this manner, the snapshot of the baseline TD or enclave is generated, and a state is preserved for cloning of the baseline TD or enclave.

In some embodiments, as shown in FIG. 4B, upon an event occurring to trigger generation of one or more clones of the TD or enclave 430, the process continues with unsealing an escrow and cloning policy for the baseline TD or enclave 434. A cloning key is generated for export of the baseline TD or enclave snapshot 438. The TD/enclave state is then exported from the escrow platform and is imported to the target platform using a cloning session key 442.

Data is then streamed from the escrow platform to the target platform to complete cloning of the TD or enclave 446. The process 400 then may continue with updating the escrow and cloning policy for the cloning of the TD or enclave and generating any additional requested clones of the TD or enclave 450.

Figure 5:
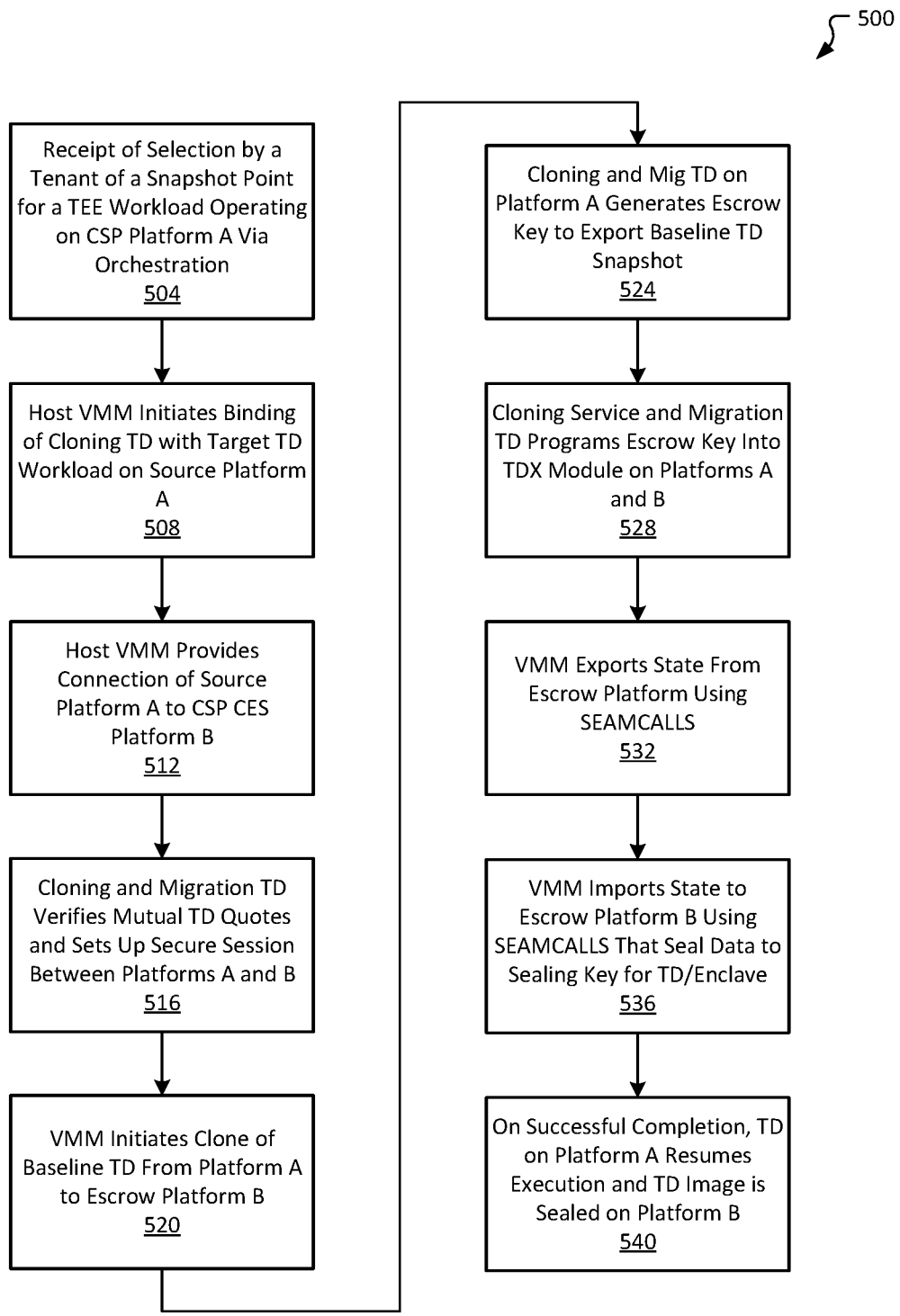
FIG. 5 is a flow chart to illustrate a process to generate a clone snapshot for a trust domain or secure enclave, according to some embodiments.
Figure 6:
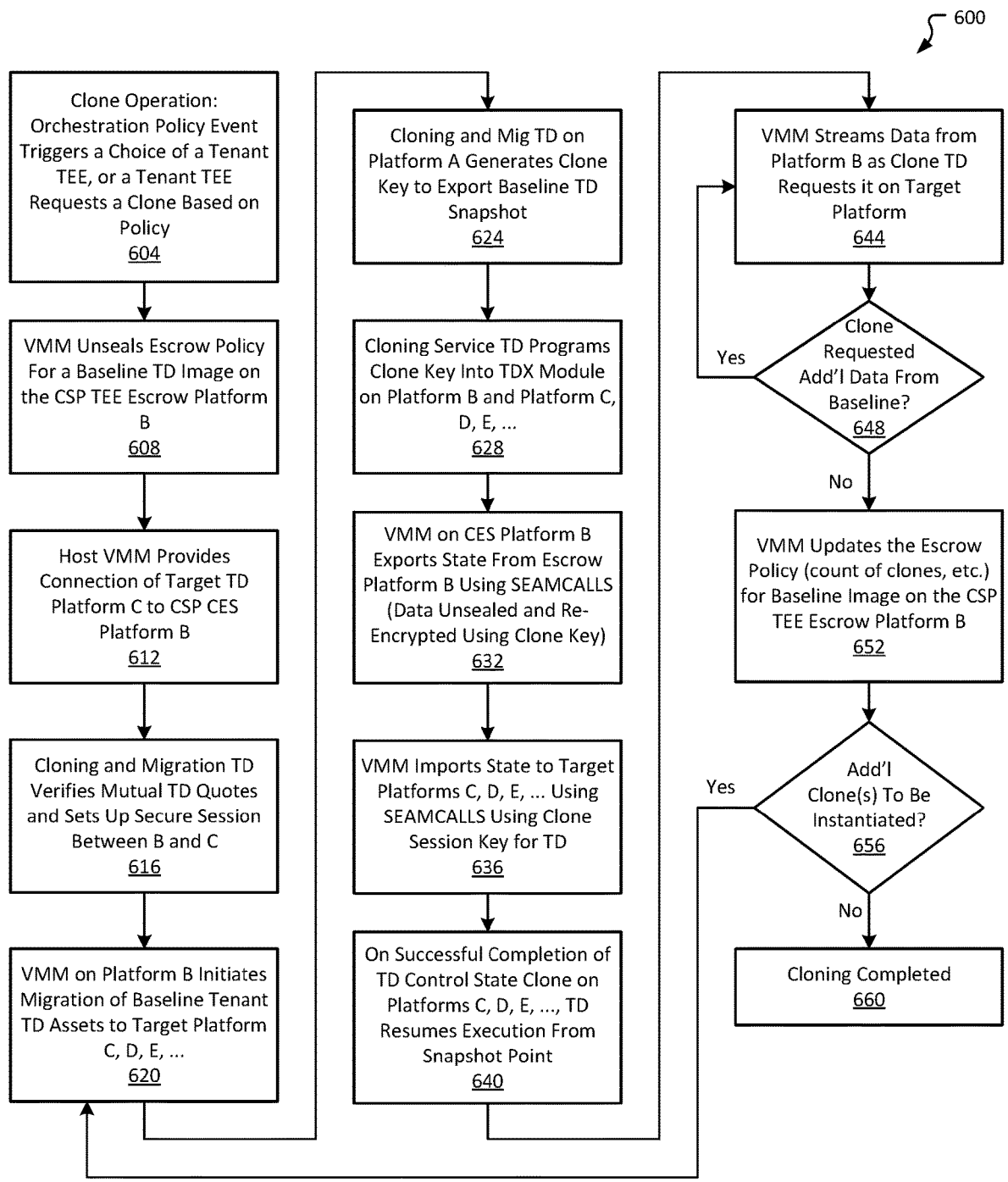
FIG. 6 is a flowchart to illustrate a process for creating one or more clones from a trusted domain or enclave snapshot, according to some embodiments.

Additional details regarding generation of a clone snapshot for a TD or enclave and creating one or more clones from a trusted domain or enclave snapshot may be as provided in FIGS. 5 and 6.

FIG. 5 is a flow chart to illustrate a process to generate a clone snapshot for a trust domain or secure enclave, according to some embodiments. In a process 500 to create a clone snapshot for a trust domain to an identified cloud service provider escrow platform, a selection by a tenant in a system of a snapshot point for a TEE workload operating on a cloud service provider (CSP) platform (Platform A, in an example), which may be referred to as the source platform, via orchestration (i.e., via an orchestrator) is received 504. A host VMM initiates binding of the cloning TD with a target TD workload on Platform A 508 (a first platform). The host VMM provides connection of the source platform to a CSP cloning and escrow service (CES) Platform B 512 (a second platform). A cloning and migration TD is to verify mutual TD quotes and set up a secure session between Platform A and Platform B 516. The VMM can then initiate cloning of the tenant TD from source Platform A to escrow Platform B 520.

In some embodiments, the cloning and migration TD on Platform A generates an escrow key to export the source TD snapshot 524, and programs the escrow key into, for example, a TDX module on Platforms A and B 528. The VMM exports the state of the TD or enclave from the escrow platform, using, for example, SEAMCALLS (Secure Arbitration Mode Calls) 532. The VMM then imports the TD or enclave state to Escrow Platform B using SEAMCALLS that seal data to a sealing key for TD 536.

On successful completion of the process 500, the TD on Platform A resumes execution and the TD image is sealed on Platform B 540.

FIG. 6 is a flowchart to illustrate a process for creating one or more clones from a trusted domain or enclave snapshot, according to some embodiments. In some embodiments, a process 600 provides for create one or more clones from a TD snapshot to one or more CSP target platforms (from the escrow platform).

In some embodiments, an action triggers a clone operation, such as an orchestration policy event (which may be an action by an orchestrator) triggering a choice of a tenant TEE, or a tenant TEE requesting a clone based on an escrow and cloning policy 604. A VMM unseals an escrow and cloning policy for a baseline TD image on the CSP TEE escrow Platform B 608. The host VMM provides connection of the target TD platform to the CSP CES Platform B 612. A cloning and migration TD is to verify mutual TD quotes and set up a secure session between Platform B and a target Platform C 616 (a third platform). The VMM on Platform B initiates migration of baseline tenant TD assets to target Platforms C, D, E, etc. (depending on the clone to be generated) 620.

In some embodiments, the cloning and migration TD on Platform A generates a clone key to export the source TD snapshot 624. The cloning service TD programs the clone key into, for example, a TDX module on Platform B and the target Platform C, D, E, etc. 628. The VMM on CES Platform B exports the state from the escrow platform B, using, for example, SEAMCALLS, with data being unsealed and reencrypted using the clone key 632. The VMM then imports the state to the relevant Target Platform C, D, E, etc. using a clone session key for the TD 636.

On successful completion of the TD control state clone on Platform C, D, E, etc., the TD resumes execution from the snapshot point 640, and the VMM streams data from Platform B as the clone TD requests it on the target Platform 644. There is then a determination whether the clone has requested additional data from the baseline TD 648. If so, the VMM continues streaming data from Platform B 644. If not, the VMM updates the escrow and cloning policy, which may include the number of clones still to be generated, etc., for the baseline image on the CSP TEE Escrow Platform B 652.

In some embodiments, a determination is made whether there are one or more additional clones to be instantiated 656, as determined from the updated escrow and cloning policy. If so, then the process 600 returns to the VMM on Platform B initiating migration of baseline tenant TD assents to the remaining target platforms 620. If there are no more additional clones to be instantiated 656, then the cloning operation is completed 660.

FIG. 7 illustrates an embodiment of an exemplary computing architecture for scalable cloning and replication for hardware trusted execution environments, according to some embodiments. In various embodiments as described above, a computing architecture 700 may comprise or be implemented as part of an electronic device. In some embodiments, the computing architecture 700 may be representative, for example, of a computer system that implements one or more components of the operating environments described above. The computing architecture 700 may be utilized to provide scalable cloning and replication for hardware trusted execution environments, such as described in FIGS. 1-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In one embodiment, the system 700 is a processing platform incorporated within a system-on-a-chip (SoC or SOC) integrated circuit for use in mobile, handheld, or embedded devices.

An embodiment of system 700 can include, or be incorporated within, a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory 704 is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, non-volatile memory device such as flash memory device or phase-change memory device, or some other memory device having suitable performance to serve as process memory. Memory device 720 may further include non-volatile memory elements for storage of firmware. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device, or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

The following Examples pertain to certain embodiments:

In Example 1, one or more non-transitory computer-readable storage mediums have stored thereon executable computer program instructions for receiving a selection of a point to capture a snapshot of a baseline trust domain (TD) or secure enclave, the TD or secure enclave being associated with a trusted execution environment (TEE) of a processor utilized for processing of a workload; initiating cloning of the TD or secure enclave from a source platform to an escrow platform; generating an escrow key to export the snapshot to the escrow platform; and exporting a state of the TD or secure enclave to the escrow platform, the state being sealed with a sealing key.

In Example 2, the instructions further include instructions for, in response to an event to trigger generation of a clone of the TD or secure enclave for a target platform, unsealing an escrow and cloning policy for the TD or secure enclave; generating a clone key for export of the TD or secure enclave; exporting the state from the escrow platform to the target platform using a cloning session key; and streaming data from the escrow platform to complete generation of the clone of the TD or secure enclave.

In Example 3, the instructions further include instructions for, in response to completing the cloning of the TD or secure enclave, updating the escrow and cloning policy; and generating one or more additional clones of the TD or secure enclave.

In Example 4, the instructions further include instructions for validating authenticity of the escrow platform for cloning of the TD or enclave.

In Example 5, a virtual machine manager (VMM) is prevented from accessing an incomplete or unauthorized clone of a TD or secure enclave.

In Example 6, the workload for the TEE is not torn down after completion of a service request associated with the workload.

In Example 7, the workload includes function as a service (FaaS) operation.

In Example 8, a method includes receiving a selection of a point to capture a snapshot of a baseline trust domain (TD) or secure enclave, the TD or secure enclave being associated with a trusted execution environment (TEE) of a processor utilized for processing of a workload; initiating cloning of the TD or secure enclave from a source platform to an escrow platform; generating an escrow key to export the snapshot to the escrow platform; and exporting a state of the TD or secure enclave to the escrow platform, the state being sealed with a sealing key.

In Example 9, the method further includes, in response to an event to trigger generation of a clone of the TD or secure enclave for a target platform, unsealing an escrow and cloning policy for the TD or secure enclave; generating a clone key for export of the TD or secure enclave; exporting the state from the escrow platform to the target platform using a cloning session key; and streaming data from the escrow platform to complete generation of the clone of the TD or secure enclave.

In Example 10, the method further includes, in response to completing the cloning of the TD or secure enclave, updating the escrow and cloning policy; and generating one or more additional clones of the TD or secure enclave.

In Example 11, the method further includes validating authenticity of the escrow platform for cloning of the TD or enclave.

In Example 12, the method further includes a virtual machine manager (VMM) is prevented from accessing an incomplete or unauthorized clone of a TD or secure enclave.

In Example 13, the method further includes the workload for the TEE is not torn down after completion of a service request associated with the workload.

In Example 14, the method further includes the workload includes function as a service (FaaS) operation.

In Example 15, an apparatus includes one or more processors to process data, wherein at least one processor includes a trusted execution environment (TEE); and a storage for storing data including one or more workloads, wherein the one or more processors are to receive a selection of a point to capture a snapshot of a baseline trust domain (TD) or secure enclave, the TD or secure enclave being associated with the TEE; initiate cloning of the TD or secure enclave from a source platform to an escrow platform; generate an escrow key to export the snapshot to the escrow platform; and export a state of the TD or secure enclave to the escrow platform, the state being sealed with a sealing key.

In Example 16, the one or more processors are further to, in response to an event to trigger generation of a clone of the TD or secure enclave for a target platform, unseal an escrow and cloning policy for the TD or secure enclave; generate a clone key for export of the TD or secure enclave; export the state from the escrow platform to the target platform using a cloning session key; and stream data from the escrow platform to complete generation of the clone of the TD or secure enclave.

In Example 17, the one or more processors are further to, in response to completing the cloning of the TD or secure enclave, update the escrow and cloning policy; and, upon determining that one or more additional clones of the TD or secure enclave are required, generate the one or more additional clones.

In Example 18, the one or more processors are further to validate authenticity of the escrow platform for cloning of the TD or enclave.

In Example 19, the apparatus further includes a virtual machine manager (VMM), wherein the VMM is prevented from accessing an incomplete or unauthorized clone of a TD or secure enclave.

In Example 20, the workload for the TEE is not torn down after completion of a service request associated with the workload.

In Example 21, an apparatus includes means for receiving a selection of a point to capture a snapshot of a baseline trust domain (TD) or secure enclave, the TD or secure enclave being associated with a trusted execution environment (TEE) of a processor utilized for processing of a workload; means for initiating cloning of the TD or secure enclave from a source platform to an escrow platform; means for generating an escrow key to export the snapshot to the escrow platform; and means for exporting a state of the TD or secure enclave to the escrow platform, the state being sealed with a sealing key.

In Example 22, the apparatus further includes means for unsealing an escrow and cloning policy for the TD or secure enclave in response to an event to trigger generation of a clone of the TD or secure enclave for a target platform; means for generating a clone key for export of the TD or secure enclave; means for exporting the state from the escrow platform to the target platform using a cloning session key; and means for streaming data from the escrow platform to complete generation of the clone of the TD or secure enclave.

In Example 23, the apparatus further includes means for updating the escrow and cloning policy in response to completing the cloning of the TD or secure enclave; and means for generating one or more additional clones of the TD or secure enclave.

In Example 24, the apparatus further includes means for validating authenticity of the escrow platform for cloning of the TD or enclave.

In Example 25, a virtual machine manager (VMM) is prevented from accessing an incomplete or unauthorized clone of a TD or secure enclave.

In Example 26, the workload for the TEE is not torn down after completion of a service request associated with the workload.

In Example 27, the workload includes function as a service (FaaS) operation.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. One or more non-transitory computer-readable storage mediums having stored thereon executable computer program instructions that, when executed by one or more processors, cause the one or more processors to perform operations comprising:
   receiving a selection of a point to capture a snapshot of a baseline trust domain (TD) or secure enclave, the TD or secure enclave being associated with a trusted execution environment (TEE) of a processor utilized for processing of a workload;
   initiating cloning of the TD or secure enclave from a source platform to an escrow platform;
   generating an escrow key to export the snapshot to the escrow platform; and
   exporting a state of the TD or secure enclave to the escrow platform, the state being sealed with a sealing key.

2. The storage mediums of claim 1, wherein the instructions further include instructions for:
   in response to an event to trigger generation of a clone of the TD or secure enclave for a target platform, unsealing an escrow and cloning policy for the TD or secure enclave;
   generating a clone key for export of the TD or secure enclave;
   exporting the state from the escrow platform to the target platform using a cloning session key; and
   streaming data from the escrow platform to complete generation of the clone of the TD or secure enclave.

3. The storage mediums of claim 2, wherein the instructions further include instructions for:
   in response to completing the cloning of the TD or secure enclave, updating the escrow and cloning policy; and
   generating one or more additional clones of the TD or secure enclave.

4. The storage mediums of claim 2, wherein the instructions further include instructions for:
   validating authenticity of the escrow platform for cloning of the TD or enclave.

5. The storage mediums of claim 2, wherein a virtual machine manager (VMM) is prevented from accessing an incomplete or unauthorized clone of a TD or secure enclave.

6. The storage mediums of claim 1, wherein the workload for the TEE is not torn down after completion of a service request associated with the workload.

7. The storage mediums of claim 1, wherein the workload includes function as a service (FaaS) operation.

8. A method comprising:
   receiving a selection of a point to capture a snapshot of a baseline trust domain (TD) or secure enclave, the TD or secure enclave being associated with a trusted execution environment (TEE) of a processor utilized for processing of a workload;
   initiating cloning of the TD or secure enclave from a source platform to an escrow platform;
   generating an escrow key to export the snapshot to the escrow platform; and
   exporting a state of the TD or secure enclave to the escrow platform, the state being sealed with a sealing key.

9. The method of claim 8, further comprising:
   in response to an event to trigger generation of a clone of the TD or secure enclave for a target platform, unsealing an escrow and cloning policy for the TD or secure enclave;
   generating a clone key for export of the TD or secure enclave;
   exporting the state from the escrow platform to the target platform using a cloning session key; and
   streaming data from the escrow platform to complete generation of the clone of the TD or secure enclave.

10. The method of claim 9, further comprising:
    in response to completing the cloning of the TD or secure enclave, updating the escrow and cloning policy; and
    generating one or more additional clones of the TD or secure enclave.

11. The method of claim 9, further comprising:
    validating authenticity of the escrow platform for cloning of the TD or enclave.

12. The method of claim 9, wherein a virtual machine manager (VMM) is prevented from accessing an incomplete or unauthorized clone of a TD or secure enclave.

13. The method of claim 8, wherein the workload for the TEE is not torn down after completion of a service request associated with the workload.

14. The method of claim 8, wherein the workload includes function as a service (FaaS) operation.

15. An apparatus comprising:
    one or more processors to process data, wherein at least one processor includes a trusted execution environment (TEE); and
    a storage for storing data including one or more workloads;
    wherein the one or more processors are to:
      receive a selection of a point to capture a snapshot of a baseline trust domain (TD) or secure enclave, the TD or secure enclave being associated with the TEE;
      initiate cloning of the TD or secure enclave from a source platform to an escrow platform;
      generate an escrow key to export the snapshot to the escrow platform; and
      export a state of the TD or secure enclave to the escrow platform, the state being sealed with a sealing key.

16. The apparatus of claim 15, wherein the one or more processors are further to:

in response to an event to trigger generation of a clone of the TD or secure enclave for a target platform, unseal an escrow and cloning policy for the TD or secure enclave;

generate a clone key for export of the TD or secure enclave;

export the state from the escrow platform to the target platform using a cloning session key; and stream data from the escrow platform to complete generation of the clone of the TD or secure enclave.

17. The apparatus of claim 16, wherein the one or more processors are further to:

in response to completing the cloning of the TD or secure enclave, update the escrow and cloning policy; and upon determining that one or more additional clones of the TD or secure enclave are required, generate the one or more additional clones.

18. The apparatus of claim 16, wherein the one or more processors are further to:

validate authenticity of the escrow platform for cloning of the TD or enclave.

19. The apparatus of claim 15, further comprising a virtual machine manager (VMM), wherein the VMM is prevented from accessing an incomplete or unauthorized clone of a TD or secure enclave.

20. The apparatus of claim 15, wherein the workload for the TEE is not torn down after completion of a service request associated with the workload.

\* \* \* \* \*